United States Patent [19]

Sittler et al.

[11] Patent Number: 4,791,398

[45] Date of Patent: Dec. 13, 1988

[54] THIN FILM PLATINUM RESISTANCE THERMOMETER WITH HIGH TEMPERATURE DIFFUSION BARRIER

[75] Inventors: Fred C. Sittler, Victoria; Adrian C. Toy, Eden Prairie, both of Minn.

[73] Assignee: Rosemount Inc., Eden Prairie, Minn.

[21] Appl. No.: 829,279

[22] Filed: Feb. 13, 1986

[51] Int. Cl.[4] .......................... H01C 3/04; H01C 7/02
[52] U.S. Cl. ........................................ 338/25; 338/308
[58] Field of Search .......... 338/25, 308, 22 R, 225 D, 338/307, 306; 29/610 R, 610 SG, 611, 569 R, 620; 427/101, 102, 125

[56] References Cited

U.S. PATENT DOCUMENTS

| | | | |
|---|---|---|---|
| 2,802,925 | 8/1957 | Von Seelen et al. | 201/63 |
| 3,564,474 | 6/1968 | Firth et al. | 338/25 |
| 3,714,702 | 2/1973 | Hammond | 29/494 |
| 4,050,052 | 9/1977 | Reichelt et al. | 338/308 |
| 4,072,593 | 2/1978 | Diehl et al. | 204/192 F |
| 4,103,275 | 7/1978 | Diehl et al. | 338/25 |
| 4,129,848 | 12/1978 | Frank et al. | 338/308 |
| 4,139,833 | 2/1979 | Kirsch | 338/308 |
| 4,222,025 | 9/1980 | Iles et al. | 338/25 |
| 4,282,507 | 8/1981 | Tindall et al. | 338/25 |
| 4,447,824 | 5/1984 | Logan et al. | 357/71 |

FOREIGN PATENT DOCUMENTS

| | | |
|---|---|---|
| 674484 | 6/1952 | United Kingdom . |
| 768117 | 2/1957 | United Kingdom . |
| 2096645B | 10/1984 | United Kingdom . |

*Primary Examiner*—E. A. Goldberg
*Assistant Examiner*—M. M. Lateef
*Attorney, Agent, or Firm*—Kinney & Lange

[57] ABSTRACT

A thin film platinum resistance thermometer capable of operation at elevated temperatures includes a benign dielectric layer covering the thin film platinum resistance temperature sensing element and a barrier layer overlying the dielectric layer. The barrier layer, which is preferably titanium dioxide, resists diffusion of contaminants which would alter the electrical characteristics of the sensing element, while permitting diffusion of oxygen through the barrier layer.

26 Claims, 3 Drawing Sheets

THIN FILM PLATINUM RESISTANCE THERMOMETER WITH HIGH TEMPERATURE DIFFUSION BARRIER

BACKGROUND OF THE INVENTION

1. Field of the Invention.

The present invention relates to an improved thin film platinum resistance thermometer, and to methods of fabrication of the improved thermometer. In particular, the present invention provides improved protection for a thin film platinum resistance thermometer to permit operation of the thermometer at elevated temperatures.

2. Description of the Prior Art.

For many years, platinum wire-wound resistors have been widely used for temperature measurements. In recent years, increased attention has been directed to thin film platinum resistance thermometers, which offer a number of unique advantages over wire-wound resistance thermometers.

First, thin film platinum resistance thermometers (TFPRTs) offer the capability of batch fabrication using techniques generally similar to those used in the semiconductor industry. Second, TFPRTs offer much greater flexibility in configuration. Third, TFPRTs offer the capability of extrmely small size. In contrast, demands for smaller dimensions typically require platinum wire wound resistors to use smaller diameter wire, and thus increase the difficulties in handling and manufacturing the resistor using such wire. Fourth, very precise trimming of the resistance values of a TFPRT potentially is possible using, for example, laser trimming.

The potential advantages of TFPRTs are discussed further in an article by W. Diehl entitled "Thin-Film-PRTD Platinum Thin-Film Resistors as Accurate and Stable Temperature Sensors", *Measurements & Control*, pp. 155-159 (December, 1982). Patents and patent applications describing TFPRTs include U.S. Pat. No. 4,050,052 issued to Reichelt; U.S. Pat. No. 4,072,593 issued to Diehl et al; U.S. Pat. No. 4,103,275 issued to Diehl et al; U.S. Pat. No. 4,129,848 issued to Frank et al; and United Kingdom patent application No. 2,096,645 published Oct. 20, 1982.

In two copending patent applications (Ser. No. 636,142 filed July 31, 1984 entitled "Platinum Resistance Thermometer", and Ser. No. 636,141 filed July 31, 1984 entitled "Method for Forming a Platinum Resistance Thermometer") which are assigned to the same assignee as the present application, an improved method of fabricating TFPRTs is described. The TFPRTs taught in these two copending applications are formed by a process in which an inert material such as silicone dioxide is deposited on a substrate and is selectively etched to form a negative pattern (or path) for the platinum thin film resistance element. The platinum thin film is deposited over both the exposed substrate surface and the surfaces of the inert material. The inert material is then etched away to permit the platinum which has been deposited on top of the inert material to be removed. This leaves only the platinum in the path which had been defined by the inert material. The resulting platinum resistance element has a columnar grain pattern. The sharp definition of edges of the resistance element, the columnar grain structure, and the minimizing of impurities results in much greater control of the temperature coefficient of resistance of the resistance element.

TFPRTs fabricated according to the method described in the two copending patent applications have exhibited excellent performance at temperatures below about 400° C. At higher temperatures, however, degradation of the electrical characteristic has been observed. In order to permit practical application of TFPRTs to harsh environments and high temperature operation, an improved TFPRT structure is needed.

SUMMARY OF THE INVENTION

The present invention is an improved thin film platinum resistance thermometer which has a multi-layer protective covering which protects the temperature sensing element against contaminants which, if permitted to interact with the platinum, would alter the electrical characteristics of the sensing element. In the present invention, the thin film platinum resistance temperature sensing element is covered by a benign dielectric layer, which in turn is covered by a barrier layer. This barrier layer overlies the dielectric layer and resists diffusion of contaminants toward the sensing element. The barrier layer also preferably permits diffusion of oxygen, so that the platinum layer is maintained in an oxygen-rich environment.

In preferred embodiments of the present invention, the benign dielectric layer is a silicon dioxide layer formed by a chemical vapor deposition using a tetraethylorthosilicate (TEOS) source, so that free silicon is not available for subsequent reaction with a poisoning of the platinum.

In a preferred embodiment, the barrier layer is titanium dioxide. This barrier layer is preferably formed by deposition of titanium, and the subsequent heat treatment of the device in an oxygen atmosphere to cause the titanium layer to be converted to titanium dioxide.

The present invention is based upon the discovery that the protective coatings previously used to protect TFPRTs from harsh environments appear to be the source of contamination and unsatisfactory performance of the TFPRT at high temperatures. Typically, TFPRTs have in the past been packaged in some form of a probe and have been coated with a glass protective coating. The glass contains various metal oxides which are not stable at high temperatures in either reducing or highly oxidizing conditions. The oxides, when broken down, allow the metal (such as lead or alkaline metals) to diffuse out of the glass and into the platinum. It is believed that the metals in between grain boundaries of the platinum thin film can disrupt the conduction mechanism, thus alter the temperature coefficient of resistance of the film.

DETAILED DESCRIPTION OF THE PREFERRED EMBODIMENTS

Figure 1A:
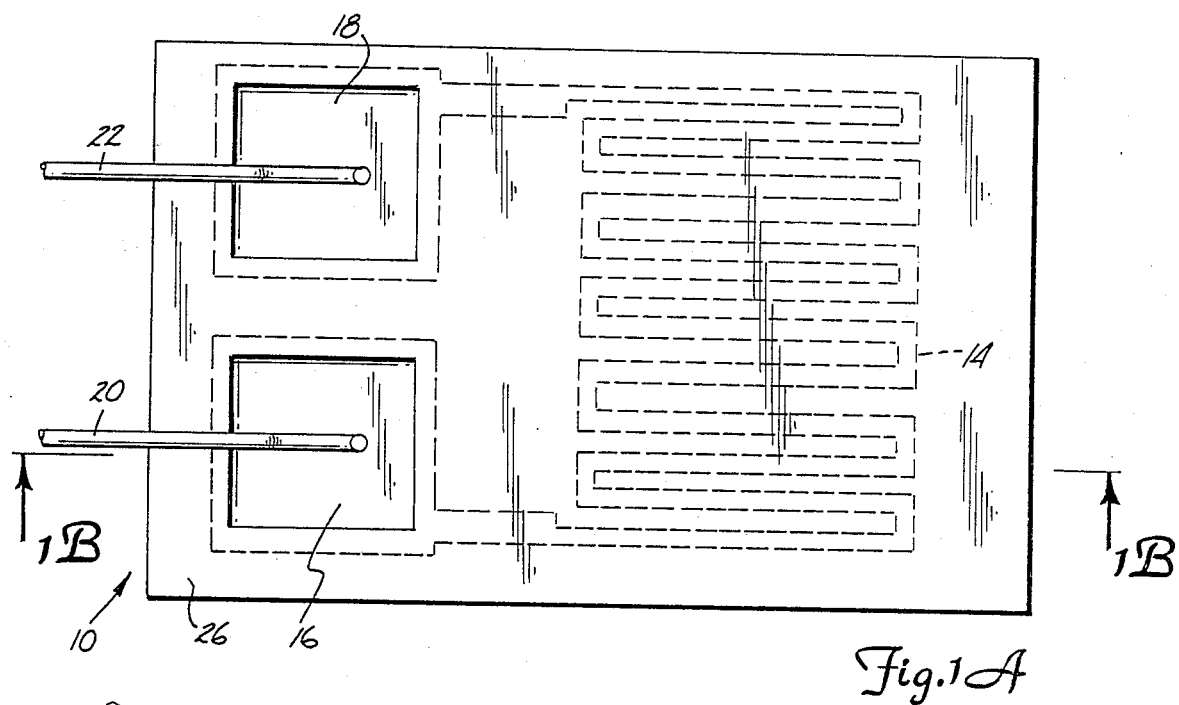
FIGS. 1A and 1B are top and sectional views, respectively, of a platinum resistance thermometer in accordance with the present invention.
Figure 1B:
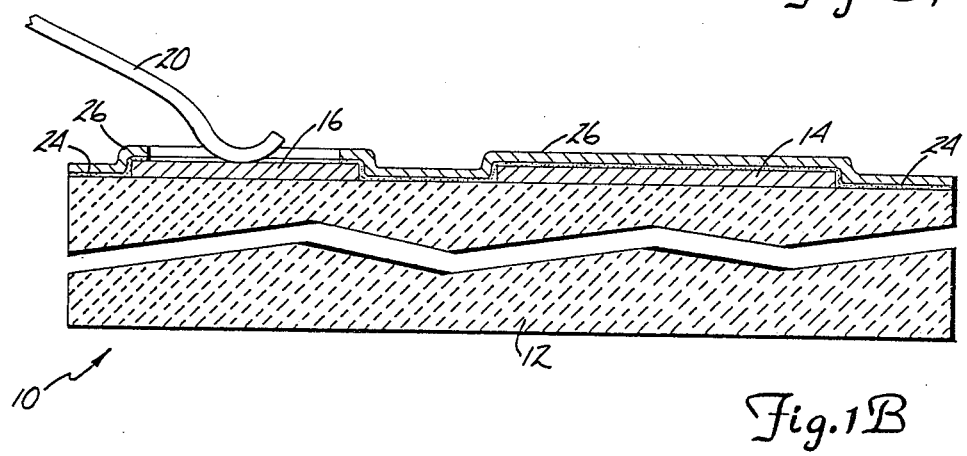

Thin film platinum resistance thermometer 10, as illustrated in FIGS. 1A and 1B, includes a substrate 12 on which resistance sensing element 14 is formed. At opposite ends of sensing element 14 are platinum contact pads 16 and 18. Wires 20 and 22 are bonded to pads 16 and 18, respectively, and provide electrical connection of TFPRT 10 to electrical circuitry (not shown) which converts the resistance of TFPRT 10 to a corresponding temperature value. Covering the top surface of TFPRT 10, other than the openings overlying contact pads 16 and 18, is a protective covering formed by dielectric layer 24 and barrier layer 26.

In a preferred embodiment of the present invention, dielectric layer 24 is silicon dioxide. The purpose of dielectric layer 24 is to provide an insulating layer over platinum sensing element 14. Dielectric layer 24 is "benign"—in other words, it is not a source of any element which would "poison" or contaminate sensing element 14.

It has been found that silicon dioxide formed by chemical vapor deposition using a tetraethylorthosilicate (TEOS) source is an excellent benign dielectric layer. The advantage of this process is that the silicon remains fully oxidized at all times, so that there are no free silicon molecules available to react with or poison the platinum. The dielectric layer 24 may also be formed by low pressure chemical vapor deposition (LPCVD) of silicon dioxide from silane and oxygen or may also be formed of alumina.

Barrier layer 26 is preferably titanium dioxide. The purpose of barrier layer 26 is to prevent contaminants from diffusing through barrier layer 26, and then through dielectric layer 24, to sensing element 14. In addition, titanium dioxide is permeable to oxygen, and therefore its barrier capabilities are selective. The permeability to oxygen is advantageous since it maintains an oxygen supply in the vicinity of sensing element 14. An oxygen-rich environment is advantageous, because platinum does not oxidize at the temperature ranges of interest, while other potential contaminants will tend to oxidize. The barrier layer 26 may also be formed from zirconia, or other compounds of titanium and zirconium.

The combined effect of barrier layer 26 and dielectric layer 24 is to provide protection of sensing element 14 at elevated temperatures (for example temperatures in the 400° C. to 600° C. range) against contaminants which would adversely affect the electrical characteristics (and in particular the temperature coefficient of resistance) of sensing element 14.

Substrate 12 is a nonconductive material which is substantially inert with respect to platinum over a wide temperature range and in reactive atmospheres or environments. Substrate 12, in effect, provides a protective barrier to prevent contamination of sensing element 14 from the back or bottom side, and must not itself contribute any contaminants which would have an adverse affect on sensing element 14. In preferred embodiments, substrate 12 is a high purity sapphire substrate having a thickness on the order of about 13 mils or 0.013 inch.

Excellent results have been achieved with the present invention using platinum thin film having a thickness of about 9600 to 9800 Angstroms to form both sensing element 14 and correponding bonding pads 16 and 18; a silicon dioxide dielectric layer having a thickness in a range of 2000 to 4000 Angstroms and preferably on the order of about 2000 Angstroms; and a titanium dioxide barrier layer 26 having a thickness in the range of 6000 to 12,000 Angstroms and preferably on the order of about 6000 Angstroms. As shown in FIGS. 1A and 1B, the areas overlying contact pads 16 and 18 are open, thus allowing the connections via wires 20 and 22. The fact that pads 16 and 18 are exposed to the environment, however, does not adversely affect the electrical characteristics of TFPRT 10 because the areas of contact pads 16 and 18 are very large, and thus do not contribute significantly to the total resistance of TFPRT 10. Thus any slight change in the resistance of contact pad 16 or 18 due to contamination has a negligible effect, where the same contaminants would have a very adverse affect on the characteristics of TFPRT 10 if they were permitted to reach sensing element 14.

The particular configuration of sensing element 14 varies depending on the particular requirements of the device. The configuration illustrated in FIGS. 1A and 1B is a simplified configuration, used for illustrative purposes, since the particular configuration of sensing element 14 is not a part of the present invention.

Figure 2A:
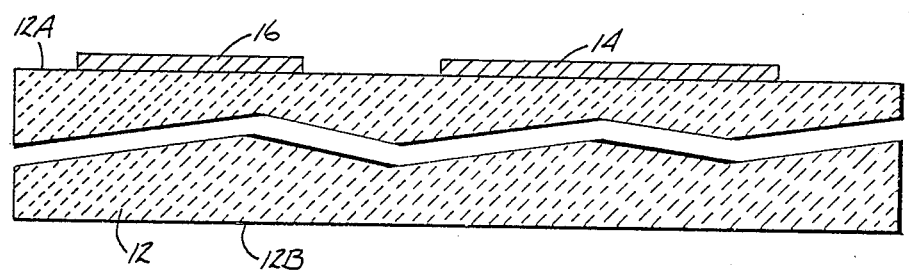
FIGS. 2A-2G show a method for forming the improved TFPRT of FIGS. 1A and 1B.

FIGS. 2A-2F illstrate a preferred method for forming TFPRT 10 of the present invention. FIG. 2A shows TFPRT 10 after sensing element 14 and contact pads 16 and 18 have been formed on top surface 12A of substrate 12. In preferred embodiments, the definition of sensing element 14 and contact pads 16 and 18 is by the liftoff process described in the two previously mentioned copending patent applications. That process results in a thin film of platinum having essentially columnar grain structure throughout the entire layer of platinum. When that process is used, FIG. 2A represents the process after the final annealing described in the copending applications. In addition, any trimming of sensing element 14 to achieve desired resistance has been completed so that all that remains is a formation of the multi-layer protective covering of the present invention.

Although the preferred method of forming the platinum layers is defined in the copending applications, other processes for forming a TFPRT are also compatible with the present invention.

Figure 2B:
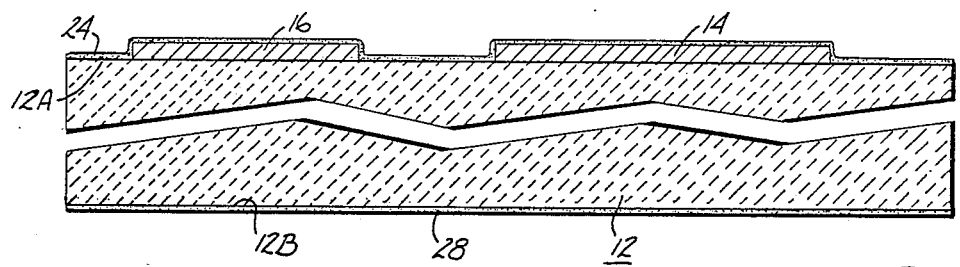

After formation of the platinum sensing element 14 and contact pads 16 and 18 is completed, dielectric layer 24 is deposited, as shown in FIG. 2B. As discussed previously, the preferred method of forming dielectric layer 24 is by chemical vapor deposition from a TEOS source. Dielectric layer 24 covers the exposed top surface 12A of substrate 12, and covers sensing element 14 and contact pads 16 and 18. The silicon dioxide deposition process also results in silicon dioxide layer 28 on the bottom surface 12B of substrate 12.

Figure 2C:
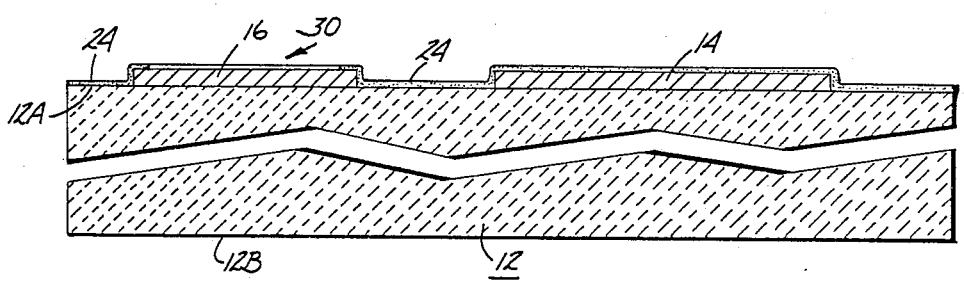

Next, as shown in FIG. 2C, windows or openings 30 over contact pads 16 and 18 are formed in dielectric layer 24 by standard photolithographic processes. A photoresist layer (not shown) is deposited over the silicon dioxide dielectric layer 24, and is exposed to define openings 30 over contact pads 16 and 18. The silicon dioxide is then etched to create openings 30 defined by the photoresist. In the same etching process, silicon dioxide layer 28 formed on bottom surface 12B of substrate 12 is removed.

Figure 2D:
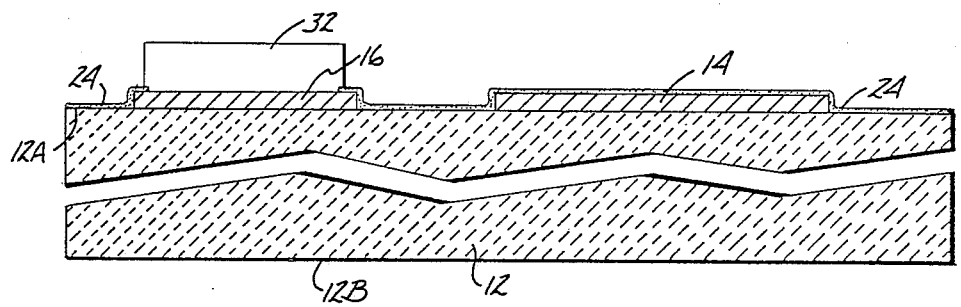

Next, a positive photoresist is used as a liftoff layer over bonding pads 16 and 18. The photoresist is first deposited over the top surface of the device, and is exposed to leave only a photoresist liftoff layer 32 overlying pads 16 and 18. The resulting liftoff layer 32 is shown in FIG. 2D.

Figure 2E:
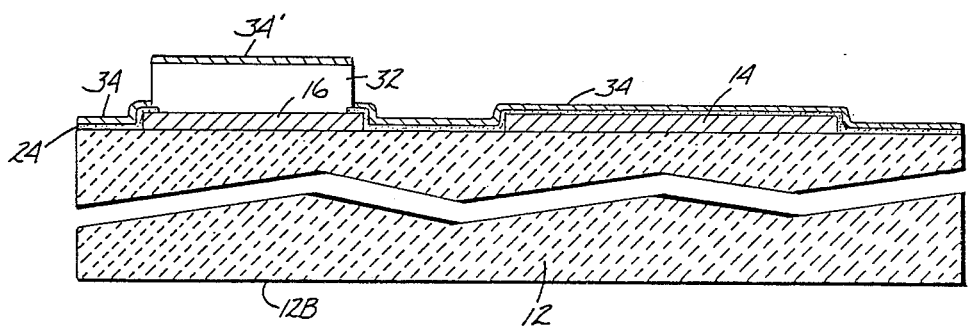

In FIG. 2E, titanium layer 34 has been deposited over the top surface of dielectric layer 24 and liftoff layer 32. Because of the thickness of liftoff layer 32, the portion 34' of titanium layer 34 which is located on top of liftoff layer 32 is either not connected at all, or connected only by a very thin and porous film to the remainder of titanium layer 34.

Figure 2F:
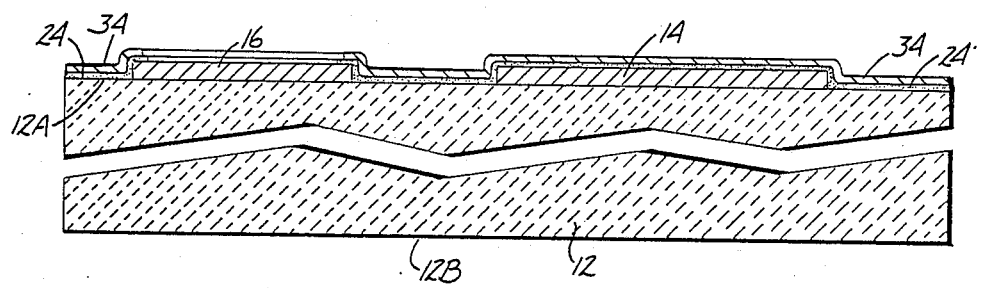

Next, photoresist layer 32 is dissolved, which results in the portion 34' of titanium layer overlying contact pads 16 and 18 being lifted off. The result is shown in FIG. 2F.

Figure 2G:
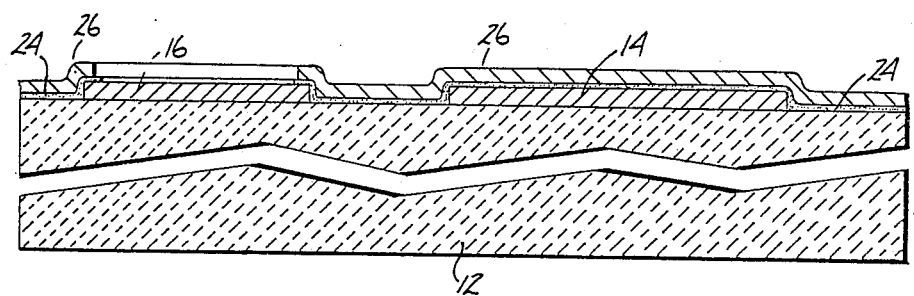

Finally, the titanium layer 32 is oxidized by heat treatment at 800° C. in a pure oxygen atmosphere. The resulting barrier layer 26 is titanium dioxide, and has a thickness which is about double the thickness of the titanium layer 34. FIG. 2G shows the device after the oxidation of the titanium layer to form barrier layer 26.

The final steps of the process are the severing of the individual TFPRTs 10 from one another and the bonding of the wire leads 20 and 22. The severing is done using conventional chip cutting techniques used in the semiconductor industry. The bonding is performed with conventional wire bonding techniques. The resulting device is shown in FIGS. 1A and 1B.

Although the two layer protective covering shown in FIGS. 1A and 1B has proved to be extremely effective, it is also possible to form further layers over barrier layer 26.

Figure 3:
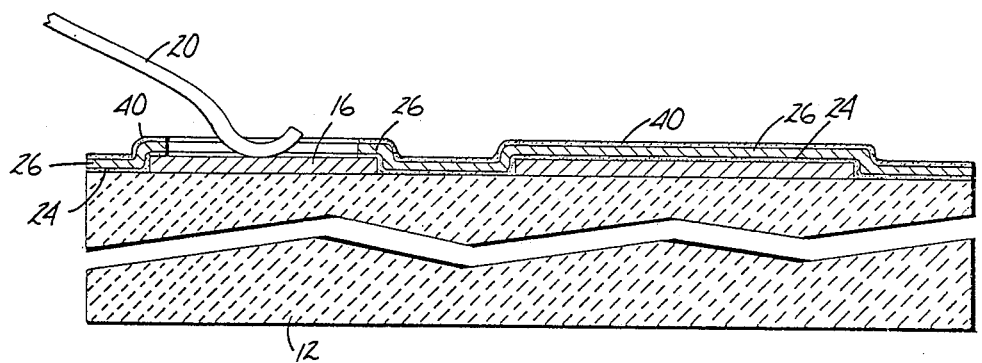
FIG. 3 is a sectional view showing another preferred embodiment of the TFPRT of the present invention.

FIG. 3 shows another embodiment of the present invention, which is generally similar to the device shown in FIGS. 1A and 1B and, for that reason, similar elements are designated by similar characteristics. In the device shown in FIG. 3, however, an additional dielectric layer 40 (preferably silicon dioxide) overlies titanium dioxide barrier layer 26. The silicon dioxide layer 40 provides further mechanical protection, and also may be used for wetting purposes to allow glasses or other protective coatings to be formed over TFPRT 10.

Although the present invention has been described with reference to preferred embodiments, workers skilled in the art will recognize that changes may be made in form and detail without departing from the spirit and scope of the invention.

What is claimed is:
1. A temperature sensor comprising:
an electrically insulating substrate;
a resistance temperature sensing element formed of platinum on a first surface of the substrate;
a benign dielectric layer covering the temperature sensing element; and
a barrier layer overlying the dielectric layer which resists diffusion of contaminants into the platinum while permitting diffusion of oxygen through the barrier layer such that the platinum is protected from contamination.

2. The temperature sensor of claim 1 wherein the barrier layer is titanium dioxide.

3. The temperature sensor of claim 2 wherein the barrier layer is formed by deposition of titanium and subsequent heat treatment in an oxygen atmosphere to form titanium dioxide.

4. The temperature sensor of claim 2 wherein the barrier layer has a thickness between about 6000 and 12,000 Angstroms.

5. The temperature sensor of claim 1 wherein the dielectric layer is silicon dioxide.

6. The temperature sensor of claim 5 wherein the dielectric layer is formed by a chemical vapor deposition process.

7. The temperature sensor of claim 6 wherein the chemical vapor deposition process uses a TEOS source.

8. The temperature sensor of claim 5 wherein the dielectric layer has a thickness of between about 2000 and 4000 Angstroms.

9. The temperature sensor of claim 1 wherein the substrate is sapphire.

10. A protective coating for preventing degradation at elevated temperatures which exceed about 400° C., of electrical characteristics of a resistance temperature sensing element formed of platinum, the protective coating comprising:
a benign dielectric layer formed of a material substantially free of alkaline metal oxides covering a surface of the resistance temperature sensing element; and
a barrier layer covering the dielectric layer, the barrier layer being formed of a material which, at the elevated temperatures, resists diffusion therethrough of contaminants into the resistance temperature sensing element which would alter the electrical characteristics of the resistance temperature sensing element.

11. A protective coating for preventing degradation at elevated temperatures which exceed about 400° C., of electrical characteristics of a resistance temperature sensing element formed of platinum, the protective coating comprising:
a benign dielectric layer covering a surface of the resistance temperature sensing element; and
a barrier layer covering the dielectric layer, the barrier layer being formed of a material which, at the elevated temperatures, resists diffusion therethrough of contaminants into the platinum which would alter the electrical charateristics of the resistance temperature sensing element, wherein the barrier layer is titanium dioxide.

12. The invention of claim 11 wherein the barrier layer is formed by deposition of titanium and subsequent heat treatment in an oxygen atmosphere to form titanium dioxide.

13. The invention of claim 11 wherein the barrier layer has a thickness of about 6000 Angstroms.

14. The invention of claim 10 wherein the dielectric layer is silicon dioxide.

15. The invention of claim 14 wherein the dilectric layer is formed by a chemical vapor deposition process.

16. The invention of claim 15 wherein the chemical vapor deposition process is a TEOS process.

17. The invention of claim 14 wherein the dielectric layer has a thickness of about 2000 Angstroms.

18. A method of forming a thin film resistance temperature sensor, the method comprising;
forming a thin film platinum resistance element on a substrate;
covering the resistance element with a first layer of a benign dielectric material; and
forming, over the first layer, a second layer of a selective barrier material which resists diffusion therethrough of contaminants which would alter electrical characteristics of the resistance element while permitting diffusion of oxygen therethrough.

19. The method of claim 18 wherein the dielectric material is silicon dioxide.

20. The method of claim 19 wherein covering the resistance element with a first layer comprises depositing silicon dioxide by a chemical vapor deposition process.

21. The method of claim 20 wherein the chemical vapor deposition process uses a TEOS source.

22. The method of claim 18 wherein the selective barrier material is titanium dioxide.

23. The method of claim 22 wherein forming the second layer comprises:
   depositing a layer of titanium over the first layer; and
   heat treating the layer of titanium in an oxygen atmosphere to form the second layer of titanium dioxide.

24. The method of claim 18 wherein the temperature sensor further includes a thin film platinum contact pad on the substrate to which the resistance element is connected.

25. The method of claim 24 and further comprising;
   selectively removing a portion of the first layer overlying the contact pad to expose a portion of the contact pad.

26. The method of claim 25 and further comprising:
   covering the exposed portion of the contact pad with a liftoff medium prior to forming the second layer; and
   removing the liftoff medium and a portion of the second layer overlying the liftoff medium to expose the contact pad.

* * * * *

UNITED STATES PATENT AND TRADEMARK OFFICE
CERTIFICATE OF CORRECTION

PATENT NO. : 4,791,398
DATED : December 13, 1988
INVENTOR(S) : Fred C. Sittler, et al.

It is certified that error appears in the above-identified patent and that said Letters Patent is hereby corrected as shown below:

In the Abstract, line 6, delete "preferrably" and insert "preferably"

Column 1, line 27, delete "extrmely" and insert "extremely"

Column 2, line 25, delete "preferrably" and insert "preferably"

Column 3, line 27, delete "preferrably" and insert "preferably"

Column 3, line 61, delete "correponding" and insert "corresponding"

Column 4, line 18, delete "illstrate" and insert "illustrate"

Signed and Sealed this

Eighth Day of August, 1989

*Attest:*

DONALD J. QUIGG

*Attesting Officer*     *Commissioner of Patents and Trademarks*